US012612039B2

(12) United States Patent

Carlander

(10) Patent No.: US 12,612,039 B2
(45) Date of Patent: Apr. 28, 2026

(54) TRIGGERING LOGIC FOR LANE KEEPING AID USING PREDICTED EVASIVE MANEUVER

(71) Applicant: Aptiv Technologies AG, Schaffhausen (CH)

(72) Inventor: Markus Carlander, Gothenburg (SE)

(73) Assignee: Aptiv Technologies AG, Schaffhausen (CH)

( * ) Notice: Subject to any disclaimer, the term of this patent is extended or adjusted under 35 U.S.C. 154(b) by 120 days.

(21) Appl. No.: 18/543,630

(22) Filed: Dec. 18, 2023

(65) Prior Publication Data

US 2024/0199011 A1    Jun. 20, 2024

(30) Foreign Application Priority Data

Dec. 16, 2022    (EP) ..................................... 22214251

(51) Int. Cl.
B60W 30/12 (2020.01)
B60W 10/20 (2006.01)
(Continued)

(52) U.S. Cl.
CPC ............ B60W 30/12 (2013.01); B60W 10/20 (2013.01); B60W 30/18145 (2013.01); B60W 40/072 (2013.01); B60W 40/103 (2013.01); B60W 40/105 (2013.01); B60W 40/114 (2013.01); B60W 50/00 (2013.01);
(Continued)

(58) Field of Classification Search
CPC .................. B60W 30/12; B60W 10/20; B60W 30/18145; B60W 40/072; B60W 40/103;
B60W 40/105; B60W 40/114; B60W 50/00; B60W 50/0098; B60W 2520/14; B60W 2520/20; B60W 2552/30; B60W 2552/50; B60W 2552/53; B60W 2710/207; B62D 15/025
See application file for complete search history.

(56) References Cited

U.S. PATENT DOCUMENTS 9,227,632 B1 *  1/2016  Lee .................... B60W 30/0956
2012/0010808 A1 *  1/2012  Yokoyama ........... B62D 15/025
701/301
(Continued)

OTHER PUBLICATIONS

Extended European Search Report for EP Application No. 22214251.5 dated May 15, 2023, 10 pages.
(Continued)

*Primary Examiner* — Lindsay M Low
*Assistant Examiner* — Susan E Scharpf
(74) *Attorney, Agent, or Firm* — Miller Johnson

(57) ABSTRACT

Disclosed is a computer-implemented method for determining a lane/road keeping maneuver of a host vehicle. The computer-implemented method includes determining at least one traveling trajectory of the host vehicle. The method includes detecting a lane boundary of a lane or a road boundary of a road that the host vehicle is traveling. The method includes determining, based on the at least one traveling trajectory and the lane/road boundary, whether at least one triggering condition for performing the lane/road keeping maneuver is met. The method includes performing the lane/road keeping maneuver to maintain the host vehicle within a predefined distance from the lane/road boundary.

15 Claims, 5 Drawing Sheets

(51) Int. Cl.

| | |
|---|---|
| *B60W 30/18* | (2012.01) |
| *B60W 40/072* | (2012.01) |
| *B60W 40/103* | (2012.01) |
| *B60W 40/105* | (2012.01) |
| *B60W 40/114* | (2012.01) |
| *B60W 50/00* | (2006.01) |
| *B62D 15/02* | (2006.01) |

(52) U.S. Cl.

CPC ....... *B60W 50/0098* (2013.01); *B62D 15/025* (2013.01); *B60W 2520/14* (2013.01); *B60W 2520/20* (2013.01); *B60W 2552/30* (2020.02); *B60W 2552/50* (2020.02); *B60W 2552/53* (2020.02); *B60W 2710/207* (2013.01)

(56) References Cited

U.S. PATENT DOCUMENTS

| | | | | |
|---|---|---|---|---|
| 2012/0283913 | A1* | 11/2012 | Lee | B62D 1/28 |
| | | | | 701/41 |
| 2016/0368534 | A1* | 12/2016 | Harda | B62D 15/025 |
| 2017/0247054 | A1* | 8/2017 | Lee | B62D 15/029 |
| 2018/0170380 | A1* | 6/2018 | Fendt | G08G 1/167 |
| 2020/0108828 | A1* | 4/2020 | Yue | B62D 6/008 |
| 2022/0135039 | A1* | 5/2022 | Jardine | B60W 30/18163 |
| | | | | 701/26 |
| 2022/0289184 | A1* | 9/2022 | Svensson | B60W 40/107 |
| 2022/0340138 | A1* | 10/2022 | Seegmiller | B60W 30/045 |
| 2023/0322208 | A1* | 10/2023 | Rojas | B60W 50/085 |
| | | | | 701/41 |
| 2024/0161331 | A1* | 5/2024 | Stein | B60W 30/08 |

OTHER PUBLICATIONS

Communication received for EP22214251.5 dated Feb. 21, 2025, 6 pages.

* cited by examiner

TRIGGERING LOGIC FOR LANE KEEPING AID USING PREDICTED EVASIVE MANEUVER

CROSS-REFERENCE TO RELATED APPLICATIONS

This application claims priority to EP Application No. 22 214 251 filed Dec. 16, 2022, the entire disclosure of which is incorporated by reference.

FIELD

The resent disclosure generally relates to computerized vehicle control and more particularly to lane/road-keeping maneuvers of a vehicle.

BACKGROUND

Advanced driver assistance systems (ADAS) are becoming a proliferated feature for vehicles. Such vehicles are also referred to as "driving assisted vehicles" or (fully) "autonomously driving vehicles". ADAS may control the vehicle to stay on a road and/or in a lane of the road by scanning the periphery and controlling the steering accordingly. This steering control is also referred to as a "lane keeping aid". Herein, the lane keeping aid controls the steering such that the vehicle does not cross lane boundaries or road boundaries.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Deciding when to activate or trigger the lane keeping aid is however a technical challenge. After all, the lane keeping aid needs to be activated when the vehicle is already in the lane or on the road. Prior art uses information associated with the sensed periphery data in combination with scaling factors and lookup tables to decide if the lane keeping aid needs to be triggered for not crossing lane boundaries or for starting to return into the lane. As such, events derived from the sensed periphery data must match entries in the lookup tables. This means, it is important to cover sufficient events for triggering to improve driving safety, which results in large lookup tables requiring additional memory. Additionally, lookup tables and scaling factors are composed of many calibration parameters making the calibration process hard for deciding when to trigger the lane keeping aid, especially when the scaling of periphery data results in unitless parameters. Such unitless parameters make the calibration even harder and reduce driving safety because validation of proper lane keeping aid triggering becomes more difficult. Therefore, prior art triggering logics may be perceived as inconsistent due to the high number of calibration parameters for different situations.

The present invention solves the shortcomings of the prior art. The above technical problems are solved by the subject-matter of the independent claims. The dependent claims describe further various embodiments.

According to an embodiment of the present invention, a computer-implemented method for determining a lane/road keeping maneuver of a host vehicle comprises: determining at least one traveling trajectory of the host vehicle; detecting a lane boundary of a lane or a road boundary of a road on which the host vehicle is traveling; determining, based on the at least one traveling trajectory and the lane/road boundary, whether at least one triggering condition for performing the lane/road keeping maneuver is met; and performing the lane/road keeping maneuver to maintain the host vehicle within a predefined distance from the lane/road boundary.

Thereby, at least one traveling trajectory e.g., for a severity associated with the lane/road keeping maneuver, may be determined and together with the lane/road boundary it may be determined whether at least one triggering condition e.g., a crossing of the lane/road boundary by at least one traveling trajectory, is met. Calibrating for different severities may be done by providing a different traveling trajectory or more than one traveling trajectories and using it/them with the at least one triggering condition. As a result, a triggering condition can be used when performing the lane/road keeping maneuver, to maintain the host vehicle within a predefined distance from the lane/road boundary without the need of lookup tables. The at least one triggering condition is also tied to measurable parameters having units. Because these parameters are no longer unitless, the determining of a lane/road keeping maneuver becomes more predictable and easier to tune or calibrate.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In the following embodiments of the present invention are explained as examples in reference to the enclosed figures. The present context outlined in the following description for explaining the present invention is not limited to any specific technical filed.

Figure 1:
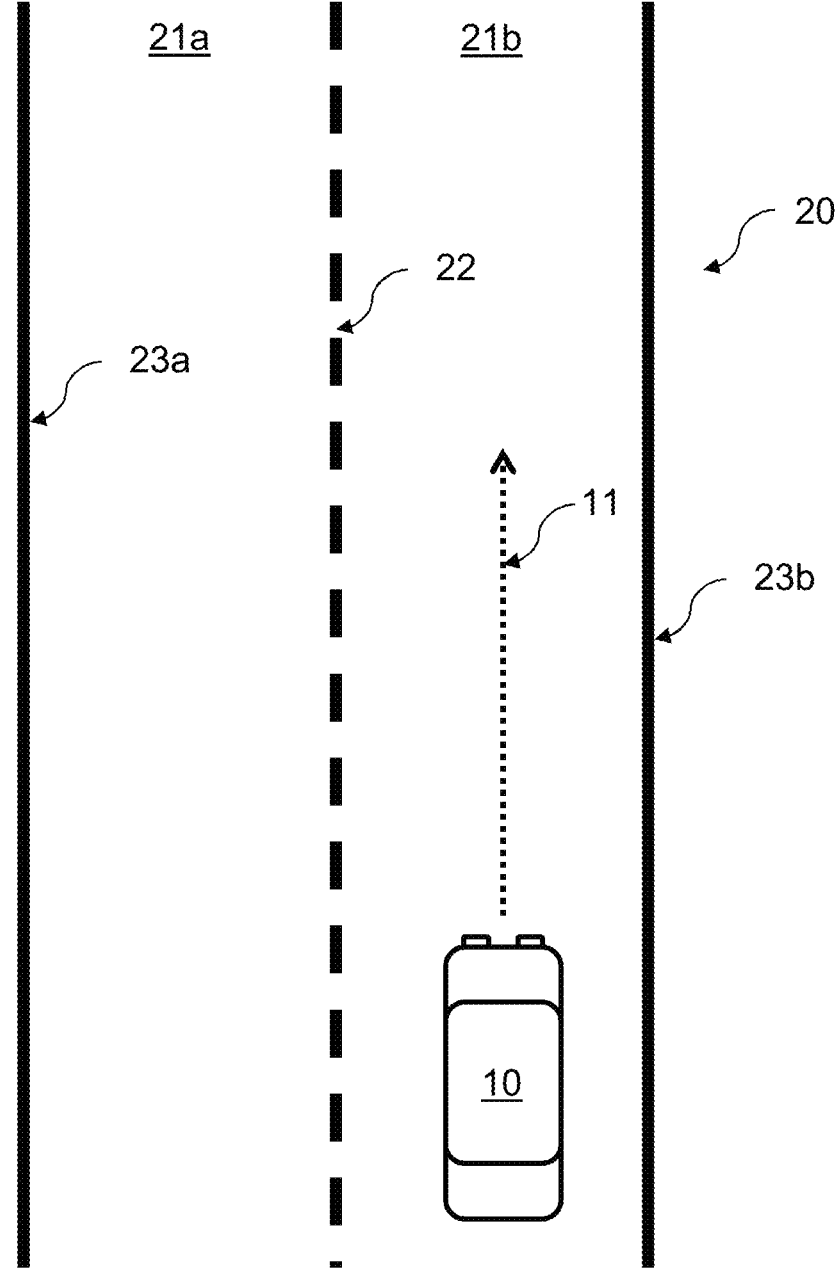
FIG. 1 illustrates a scenario of a traveling host vehicle.

Referring to FIG. 1, a host vehicle 10 may travel on a road defined by a road boundary 23 e.g., a left-side road boundary 23a and a right-side road boundary 23b. If the road contains multiple lanes 21 e.g., a left-side lane 21a and a right-side lane 21b, these lanes 21 may be divided by a lane boundary 22. Herein, the lanes 21 may be used to allow traffic to travel in one direction only e.g., like on a one-way street, motorway or highway, or to allow traffic to travel in multiple directions e.g., up-/down-direction of FIG. 1. Herein the host vehicle 10 may travel on one of the plurality of lanes 21 in a certain direction. The path the host vehicle 10 may travel is referred to as a traveling trajectory 11 and is illustrated as a dotted line in FIGS. 1, 2, 3 and 5.

Figure 2:
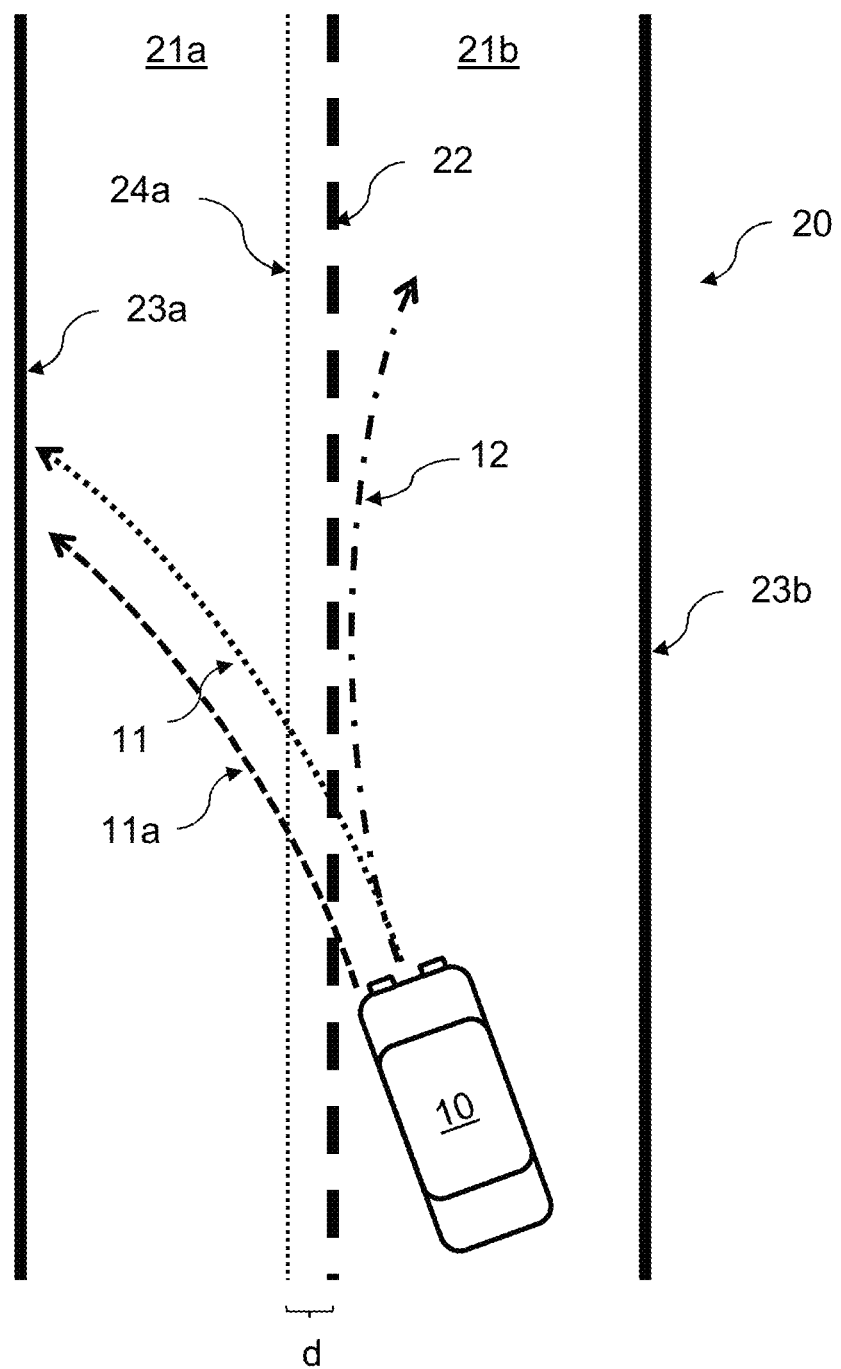
FIG. 2 illustrates a scenario where the traveling host vehicle is about to cross a lane boundary on a straight road.
Figure 3:
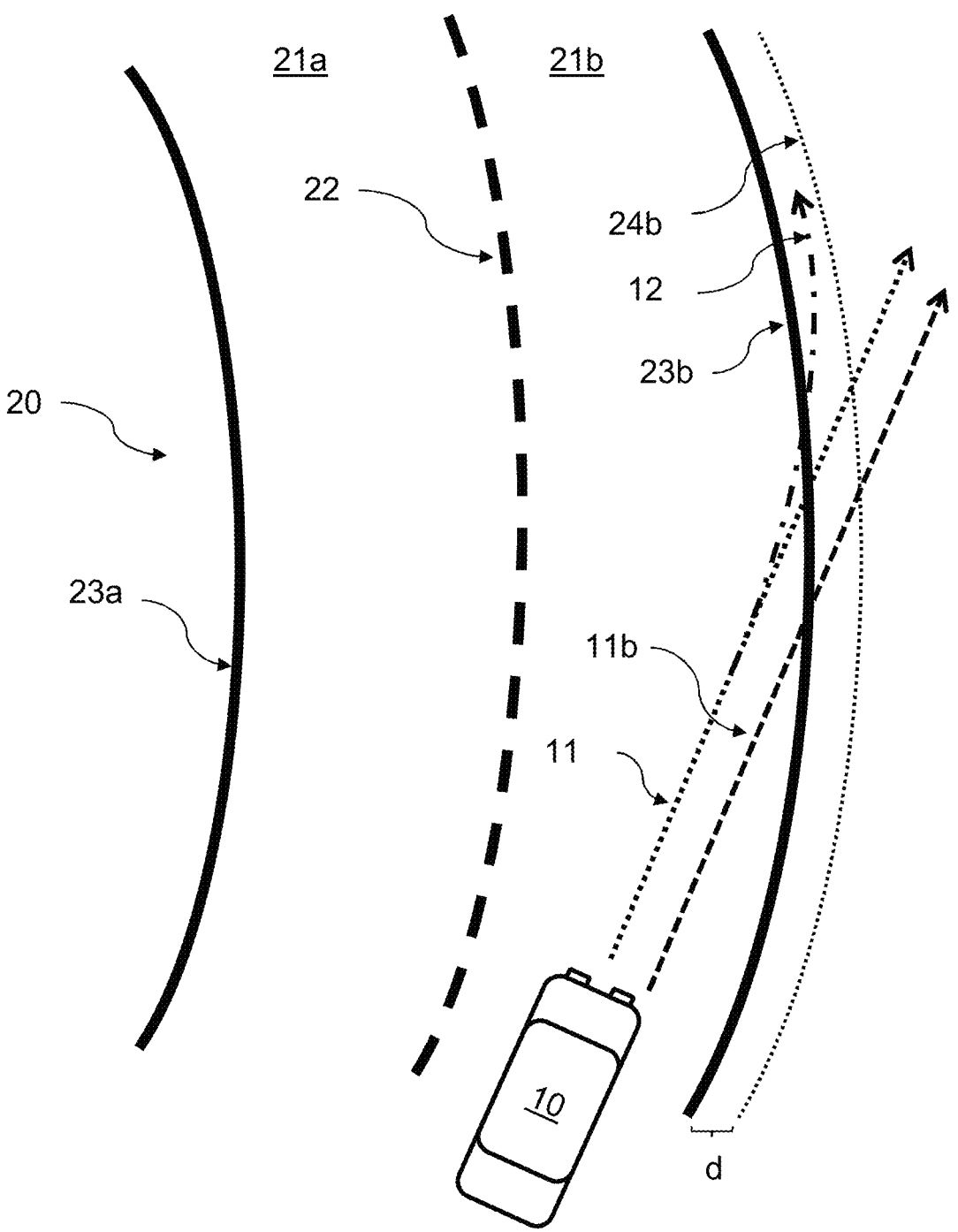
FIG. 3 illustrates a scenario where the traveling host vehicle is about to cross a lane boundary on a curved road.
Figure 5:
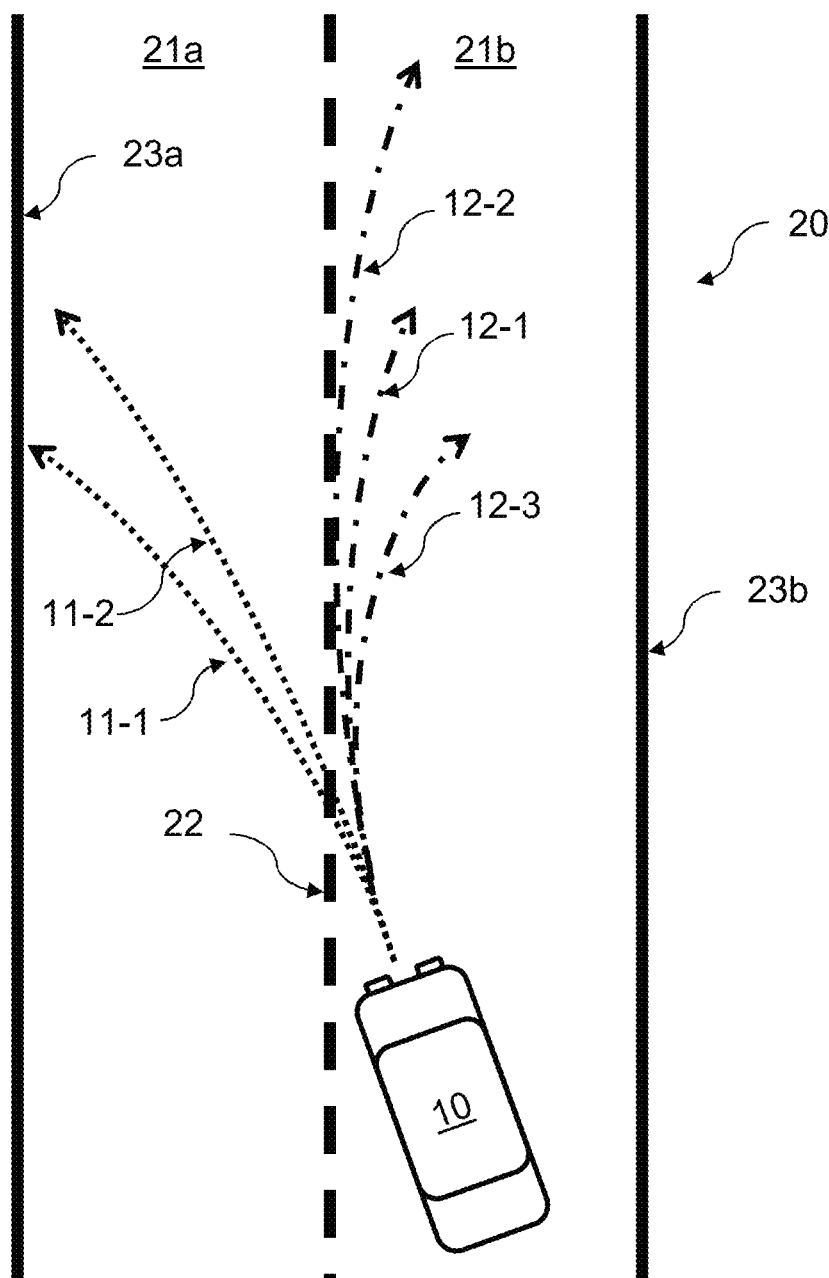
FIG. 5 illustrates a scenario where the traveling host vehicle is about to cross a lane boundary on a straight road and a plurality of traveling trajectories is determined.

As illustrated in FIGS. 2, 3 and 5 there may be a scenario where the host vehicle 10 is steered in a manner, where it may cross or intersect the lane boundary 22 or the road boundary 23. Such scenarios may be caused by manual or automatic steering input e.g., to avoid an obstacle in the lane 21 or on the road 20 e.g., resulting in a traveling trajectory 11 as illustrated in FIG. 2 or 5. Similarly, such a scenario may occur when the road 20 curves and no or an insufficient steering input is manually or automatically provided. In this latter scenario, the host vehicle 10 may be steered to not properly follow the curved road 20, e.g., resulting in a traveling trajectory 11 as illustrated in FIG. 3. As illustrated in FIG. 5, the number of traveling trajectories 11-1 to 11-3 needs not be limited to one traveling trajectory 11 as illustrated in FIGS. 2 and 3. Instead, a plurality of traveling trajectories 11-1, 11-2 may be determined e.g., measurements used for determining a single traveling trajectory 11 are ambiguous, uncertain or have tolerances. Hence, the shape of the plurality of traveling trajectories 11-1 and 11-2 may vary based on a severity of a steering.

In such example scenarios, 23 a lane/road keeping maneuver may need to be performed e.g., by engaging a lane/road keeping aid. Thereby, the host vehicle 10 may be prevented from continuously crossing the lane/road boundary 22 and/or driving outside a designated driving lane/road of the host vehicle 10. To determine when this lane/road keeping maneuver should be performed, a method as illustrated in FIG. 4 may be performed.

Figure 4:
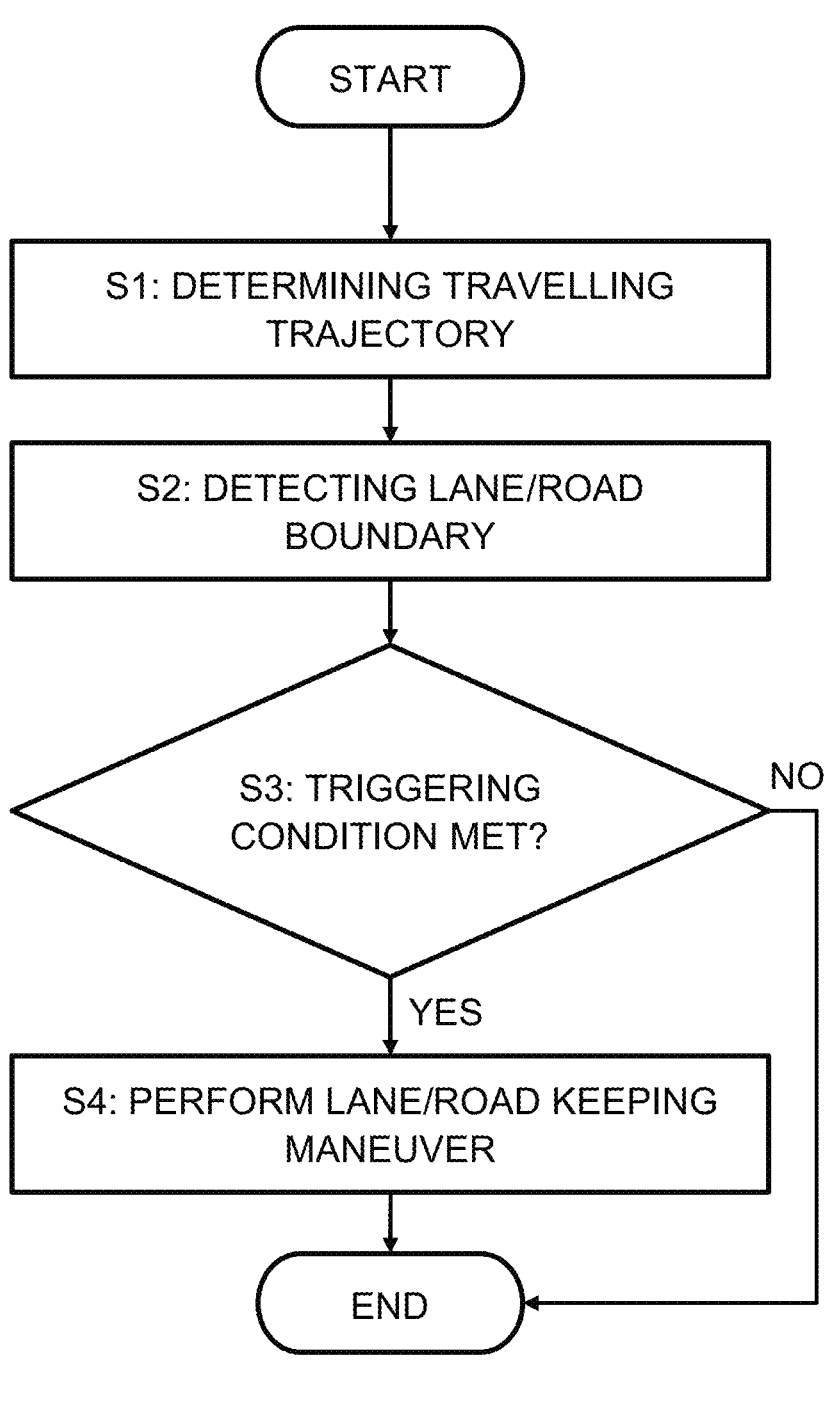
FIG. 4 illustrates a flow chart representing a method for determining a lane/road keeping maneuver of the traveling host vehicle according to the present invention.

As illustrated in FIG. 4, a computer-implemented method for determining a lane/road keeping maneuver of a host vehicle 10 may be provided. This method may comprise the steps S1 to S4. In step S1 at least one traveling trajectory 11 of the host vehicle 10 may be determined. In step S2 a lane boundary 22 of a lane 21 or a road boundary 23 of a road 20, which are hereon referred to as "lane/road boundary 22, 23", on which the host vehicle 10 is traveling may be detected. In step S3, based on the at least one traveling trajectory 11 and the lane/road boundary 22, 23, it may be determined whether at least one triggering condition for performing the lane/road keeping maneuver is met. In step S4 the lane/road keeping maneuver to maintain the host vehicle 10 within a predefined distance from the lane/road boundary 22, 23 may be performed. Herein, and as will be explained in more detail below, the at least one traveling trajectory 11 relates to the determined, predicted and/or expected traveling of the host vehicle 10, when performing the lane/road keeping maneuver, and the at least one triggering condition relates to how the at least one traveling trajectory 11 intercepts, crosses or interacts with the lane/road boundary 22, 23.

As a result, the lane/road keeping maneuver may be performed based on at least one triggering condition that is easy to tune or calibrate. Because this triggering condition does not rely on lookup tables, less memory is needed to store data for the lookup tables, and it becomes less likely that a scenario occurs, in which the lane/road keeping maneuver should be triggered but is not triggered. Thereby driving safety is improved.

The lane/road boundary 22, 23 may be determined based on periphery data obtained from sensors such as a camera, a radar, a sonar etc. of the host vehicle 10. Data analysis such as image analysis using software or hardware or a combination thereof may be used to obtain information from the periphery data corresponding to the lane/road boundary 22, 23.

The at least one traveling trajectory 11 may be determined based on sensory measurements, such as a speed, a heading, a sideslip, a yaw, a current/maximum curvature rate etc. of the host vehicle 10. A sensing unit or controller of the host vehicle 10 may collect and/or provide the sensory measurements from sensors mounted to the host vehicle 10. E.g., a model of the host vehicle 10 may be used to determine or predict the at least one traveling trajectory 11 based on one or a combination of the sensory measurements. As mentioned above, if the sensory measurements and/or prediction results in ambiguity and/or uncertainty e.g., due to measuring tolerances, a plurality of trajectories 11-1 and 11-2 may be determined to cover a broader range of possible paths the host vehicle 10 may travel. Here, the shape or curvature of the at least one traveling trajectory 11 may be based on a curvature rate of the host vehicle 10 while or when traveling.

The at least one triggering condition may be based on a set of parameters, at least relating to a predetermined acceptable crossover distance d from the lane/road boundary 22, 23 and a shape e.g., relating to curvature, location and/or position of the at least one traveling trajectory 11.

Here, the curvature rate of the host vehicle 10, which may also be referred to as "host curvature rate", may be a geometric measure indicating by how much a traveling trajectory departs from a straight line with respect to a change in time e.g., using:

$$\kappa = \frac{1}{R}[1/m]$$

where $\kappa$ is the curvature and R is a radius and the curvature rate is the time derivative of $\kappa$ in 1/ms.

A triggering condition may be a condition where the host vehicle 10 crosses the lane/road boundary 22, 23. Another triggering condition may be a condition where the host vehicle 10 crosses the lane/road boundary 22, 23 by an acceptable crossover distance d. Thereby it can be decided whether to perform the lane/road keeping maneuver with respect to the actual lane/road boundary 22, 23 and/or whether it is allowed to cross the lane/road boundary 22, 23 to a certain degree. Thereby, unnecessary lane/road keeping maneuvers can be avoided, reducing the risk of travel sickness and improving the traveling comfort and user experience.

That is to say, the at least one triggering condition may not be met if the actual lane/road boundary 22, 23 is crossed, but when the host vehicle 10 crosses the lane/road boundary 22, 23 by the acceptable crossover distance d. To reflect this distance, FIGS. 2 and 3 illustrate a shifted lane/road boundary 24a, 24b next to the lane/road boundary 22, 23. E.g., the determining S3 of whether the triggering condition is met may comprise determining whether the traveling trajectory 11 crosses the detected lane/road boundary 22, 23 by at least a predetermined acceptable crossover distance d. Herein, the acceptable crossover distance may be a value of 1 cm or more or 20 cm or less. The exact value may be based on the type of lane/road and/or a type of the host vehicle 10. E.g., a lorry or truck may need to cross the lane/road boundary 22, 23 more when turning compared to a car.

A plurality of acceptable crossover distances d covering a range of acceptable crossover distances may be defined and one triggering condition may be associated with each of the plurality of acceptable crossover distances d. E.g., 20 acceptable crossover distances of 1 cm, 2 cm, . . . 10 cm, . . . 19 cm and 20 cm may be used, but the number of acceptable crossover distances is not limiter thereto and a finer, coarser or subset range may be used. When determining how many of the triggering conditions are met, each associated with an acceptable crossover distance d, feedback with respect to the excess of the crossing of the lane/road boundary can be obtained. E.g., when two out of the 20 acceptable crossover distances have been exceeded, two triggering conditions may be met and it may be fed back, that performing a lane/road keeping maneuver is unlikely to occur soon. With this feedback an occupant may be notified of whether the host vehicle 10 will likely perform a lane/road keeping maneuver. Thereby the occupant can be warned, reducing the risk of travel sickness and improving the traveling comfort and user experience.

Because the set of parameters may relate to the acceptable crossover distance d from the lane/road boundary 22, 23 e.g., as illustrated in FIGS. 2 and 3, and to the shape of the traveling trajectory 11, minor or negligible lane/road boundary crossing is filtered or omitted i.e., not considered by the triggering condition. This filtering reduces the number of performing unintended or incorrect lane/road keeping maneuvers, reducing the risk of travel sickness and improving the traveling comfort and user experience.

The set of parameters may relate to the curvature rate of the host vehicle 10. Thereby, it may be determined whether the host vehicle 10 can actually travel along the at least one traveling trajectory 11 and, optionally, cross the land/road boundary 22, 23. E.g., a traveling trajectory 11 determined with a large curvature rate, like traveling trajectory 11-1 in FIG. 4, may result in that the host vehicle 10 and/or the determined traveling trajectory 11 crosses a lane/road boundary 22, 23 earlier in comparison to a traveling trajectory 11 with a smaller curvature rate, like traveling trajectory 11-2 in FIG. 4. Based thereon, it may be determined with increasing certainty, whether and/or when the host vehicle 10 or the traveling trajectory 11 crosses the lane/road boundary 22, 23. As a result, the performing of lane/road keeping maneuvers is based on a more accurate and realistic determination or prediction of the traveling trajectory 11 and the triggering is performed at a correct moment in time, e.g., not too early where the triggering may reduce driving comfort and not too late where the triggering may not serve its purpose of upholding driving safety. Thereby, fewer unintended or incorrect lane/road keeping maneuvers are performed.

A triggering condition may be a condition based on a trajectory different to the traveling trajectory 11. E.g., at least one steering back trajectory 12 for steering the host vehicle 10 back into the center of lane/road may be determined, and the at least one triggering condition may be based on a set of parameters, at least relating to the predetermined acceptable crossover distance d from the lane/road boundary 22, 23 and the at least one steering back trajectory 12. That is to say, the set of parameters may relate to the traveling trajectory 11 and/or the steering back trajectory 12, as well as the lane/road boundary 22, 23. Here, the determining of the at least one steering back trajectory 12 may be performed as part of or separate to the determining S1 of the at least one traveling trajectory 11.

FIGS. 2, 3 and 5 illustrate such a steering back trajectory 12 as a dash-dotted line. Although FIG. 2 illustrates the steering back trajectory 12 as starting from the host vehicle, the present invention is not limited thereto. The steering back trajectory may start from a point along the determined traveling trajectory 11 e.g., as illustrated in FIGS. 3 and 5. Specifically, if a plurality of traveling trajectories 11-1, 11-2 and/or a plurality of steering back trajectories 12-1 to 12-3, as described below, are determined a start of the steering back trajectory further along the traveling trajectory 11 may be possible for more severe lane/road keeping maneuvers. In general, however, the steering back trajectory 12 may be based on a curvature rate of the host vehicle 10.

The curvature rate for determining the steering back trajectory 12 is similar to or the same as the curvature rate of the traveling trajectory 11 and/or of the host vehicle 10 traveling along the traveling trajectory 11. Therefore, a similar or the same curvature rate (parameter) of the determined traveling trajectory 11 may be used to determine the steering back trajectory 12 for steering the host vehicle 10 back to the lane/road center. This reduces the number of parameters necessary for triggering the lane/road keeping maneuver and performing the lane/road keeping maneuver. In this scenario, the steering input just before triggering/performing the lane/road keeping maneuver is the same as that applied by the lane/road keeping maneuver. Therefore, the driving safety is upheld without impacting driving comfort.

As mentioned above, the number of determined steering back trajectories 12 is not limited to one. The determining of at least one steering back trajectory 12 may comprise determining a plurality of traveling trajectories 12-1, 12-2, 12-3 e.g., as shown in FIG. 4, each with a different predetermined curvature rate of the host vehicle 10. Herein, each of the steering back trajectories 12-1, to 12-3 may be based on a curvature rate of the host vehicle 10 while or when performing the lane/road keeping maneuver. That is to say, a plurality of steering back trajectories 12-1 to 12-3 may be determined and one or more thereof may be used for determining whether the at least one triggering condition for performing the lane/road keeping maneuver is met.

The curvature rate of the host vehicle 10 may be determined based on a severity of the lane/road keeping maneuver and may be limited by a predetermined maximum host curvature rate. Put differently, the shape of the at least one steering back trajectory 12 may be based on the severity of a lane/road keeping maneuver. Herein, the severity may be based on an operation state of the host vehicle 10 and/or a priority or urgency of the steering back trajectory 12. E.g., the host vehicle 10 may be traveling in a comfort state, a normal state or an emergency state. Correspondingly, a comfortable lane/road keeping maneuver may be determined as being early, smooth and comfortable as illustrated with steering back trajectory 12-2 in FIG. 4, an emergency road keeping maneuver may be determined as being late, abrupt and harsh as illustrated with steering back trajectory 12-3 in FIG. 4, and a normal lane/road keeping maneuver may be determined as a compromise of the comfortable and emergency lane/road keeping maneuver as illustrated with steering back trajectory 12-1 in FIG. 4. Thereby, a higher severity indicated by a corresponding operation state may result in performing the lane/road keeping maneuver with a higher curvature rate, and a lower severity indicated by a corresponding operation state may result in performing the lane/road keeping maneuver with a lower curvature rate. Thereby, the performing of lane/road keeping maneuvers takes into account whether it is an emergency. The operation state may be set manually or automatically based on the periphery of the host vehicle 10. E.g., when it is detected that there is oncoming traffic or a curve that is difficult to see, the operation state may be set to normal state or emergency state instead of comfort state. Thereby, the severity or necessity of the lane/road keeping maneuver is taken into account when determining whether to perform the lane/road keeping maneuver.

Each of the plurality of steering back trajectories 12-1 to 12-3 may be assigned a priority or priority level and a comparison priority or priority level threshold of the host vehicle 10 may be set. The determining S3 of whether at least one triggering condition is met may further comprise: determining whether the priority of the steering back trajectory 12 of the corresponding triggering condition matches the set comparison priority; or determining whether the priority level of the steering back trajectory 12 of the corresponding triggering condition is at least equal to the set priority level threshold. Steering back trajectories 12 for the above emergency lane/road keeping maneuver may be assigned a high priority or large priority level, and steering back trajectories 12 for the above comfortable lane/road keeping maneuver may be assigned a low priority or small priority level. Thereby, the triggering of the lane/road keeping maneuver may take into account the possible delay, urgency or necessity of performing a lane/road keeping maneuver. It hence becomes possible to trigger specific lane/road keeping maneuvers at corresponding moments in time necessary to uphold driving safety without impacting driving comfort.

In a similar manner, when a plurality of traveling trajectories 11 is determined, each of the plurality of traveling trajectories 11 may be assigned a priority or urgency. Based on a predetermined threshold, the traveling trajectory 11 with a corresponding priority may be used for determining whether a triggering condition has been met.

In a similar manner, each lane/road boundary 22, 23 may be assigned a priority or urgency and taken into account for the at least one triggering condition. Thereby, crossing of a lower priority lane/road boundary 22, 23 may not cause performing the lane/road keeping maneuver, and crossing of a higher priority lane/road boundary 22, 23 may cause performing the lane/road keeping maneuver. Put differently, being able to set the operation state or priority or urgency as outlined above allows the user to set the sensitivity of triggering performing the lane/road keeping maneuver. Thereby, the triggering can be configured or tuned easily and in a robust manner, reducing the risk of travel sickness and improving the traveling comfort and user experience.

The maximum number of traveling trajectories 11 as described above and/or maximum number of steering back trajectories 12 as described above is not limited to respectively two or three and may be any positive integer greater than or equals to one.

A traveling trajectory 11 may be determined for the center of the host vehicle 10 and/or for a boundary on at least one side of the host vehicle 10 for the determining of whether the triggering condition is met. Examples of such traveling trajectories 11 based on the boundary of the host vehicle 10 may be the "boundary travel trajectories 11a, 11b" that may be determined for one or more sides or edges of the host vehicle 10. FIGS. 2 and 3 illustrate such a boundary travel trajectory 11a, 11b as a dashed line. E.g., in a scenario according to FIG. 2 the left boundary traveling trajectory 11a may be determined as corresponding to a left side of the host vehicle 10, and in a scenario according to FIG. 3 the right boundary traveling trajectory 11b may be determined as corresponding to a right side of the host vehicle 10. By considering the boundary traveling trajectories 11a, 11b instead of the traveling trajectory 11 at the center of the host vehicle 10, which may also be referred to as "center traveling trajectory", the width of the host vehicle 10 is taken into account. This may become relevant, when the center of the host vehicle 10 does not cross the lane/road boundary 22, 23 or one or more shifted lane/road boundaries 24a, 24b, but a boundary, border or edge of the host vehicle 10 does. Because the host vehicle 10 may still collide with other traffic or depart from the lane 21 or road 20 in such a scenario, the determining of whether the triggering condition is met may be based on the boundary traveling trajectories 11a, 11b.

The traveling trajectory 11 and/or the steering back trajectory 12 may be represented as an intervention motion polynomial (IMP), wherein the lane/road boundary 22, 23 may be represented as a boundary polynomial (BP), and at least one of an acceptable crossover distance d and a curvature rate is a parameter for defining the IMP. In this case, the IMP may be formulated according to the following third-degree polynomial:

$$y = a_0 + a_1 x + a_2 x^2 + a_3 x^3$$

Herein, coefficients a0-a2 may be based on the current host motion sensed by the host vehicle 10 e.g., approximated constant curvature, and a3 may be a tunable or configurable parameter based on a predetermined curvature rate. If the IMP is an intervention motion center polynomial (IMCP), it may be translated the border or boundary of the host vehicle 10 and denoted as an intervention border center polynomial (IMPB). By using polynomials in this manner, the traveling trajectory 11, steering back trajectory 12, lane/road boundary 22, 23 and/or shifted lane/road boundary 24 can be represented with fewer parameters without losing significant spatial accuracy. Thereby computational load and memory requirements to determine whether the triggering condition is met are reduced.

The determining of whether the triggering condition is met may comprise shifting the detected lane/road boundary 22, 23 by at least a predetermined acceptable crossover distance d, and determining whether the traveling trajectory 11 and/or the steering back trajectory 12 crosses the lane/road boundary 24 that is shifted e.g., the shifted lane boundary 24a illustrated in FIG. 2 or the shifted road boundary 24b in FIG. 3. Put differently, as illustrated in FIGS. 2 and 3, not the lane/road boundary 22, 23 may be used for determining whether the triggering condition is met, but the shifted lane/road boundary 24 may be used. As a result, instead of having to calculate a crossover distance multiple times for determining whether the traveling trajectory 11 and/or the steering back trajectory 12 crosses the lane/road boundary 22, 23 by the acceptable crossover distance d, it only needs to be determined if the traveling trajectory 11 and/or the steering back trajectory 12 crosses the shifted lane/road boundary 24. This reduces the computational load as fewer calculations need to be performed.

The acceptable crossover distance d may be determined based on a lane/road boundary type. The lane boundary type may be based on a marking of the lane 21, which may also be referred to as "lane marking", and/or a coloring of the lane marking. The road boundary type may be based on a location of an edge of the road 20, which may also be referred to as "road edge", a barrier of the road 20, which may also be referred to as "road barrier", and/or a property of a surface of the road 20, which may also be referred to as "road surface".

Herein, a dashed lane marking may indicate that lane changing or overtaking is allowed, whilst a continuous line as a lane marking may indicate that lane changing or overtaking is not allowed. According thereto, the acceptable crossover distance d may be lowered when lane changes or overtaking is not allowed or the acceptable crossover distance d may be increased when lane changes or overtaking is allowed. As a result, the performing of unnecessary lane/road keeping maneuvers is avoided. In the present disclosure, when referring to the lane/road boundary 22, 23 the shifted lane/road boundary 24 may be used instead, too. However, for conciseness and better legibility, an explicit indication thereof is omitted.

The determining of whether the triggering condition is met may comprise determining whether the traveling trajectory 11 and/or the steering back trajectory 12 crosses the lane/road boundary 22, 23 with a predetermined host curvature rate i.e., the curvature rate of the host vehicle 10. E.g., when crossing the lane/road boundary 22, 23 at a low host curvature it is more likely that the host vehicle 10 will continue to cross the lane/road boundary 22, 23 for a longer period of time. Also, if the road 20 is curved, a smaller curvature rate may similarly cause a crossing of the lane/road boundary 22, 23 for a predetermined period of time. This crossing for a predetermined period of time may be used to determine that the triggering condition is met. Therefore, short or negligible crossing of the lane/road boundary 22, 23 may be filtered or omitted to not cause a determining that the triggering condition is met. As a result, the probability is reduced that an unintended or incorrect lane/road keeping maneuver is performed.

The performing the lane/road keeping maneuver may further comprise steering the host vehicle 10 back into the center of lane/road 20, 21 or steering the host vehicle 10 according to one of the at least one steering back trajectory 12. Thereby, it is assured that the lane/road keeping maneuver does not accidentally center the host vehicle 10 into an incorrect lane.

The method described above and illustrated in FIG. 4 may be repeated at regular intervals as the host vehicle 10 is traveling. Thereby, the necessity of performing lane/road keeping maneuvers is assessed regularly and traveling safety is improved.

Although exemplified as a car in FIGS. 1, 2, 3 and 5, it is noted that the host vehicle 10 is not limited thereto. That is to say, the host vehicle 10 may be any kind of mechanism for traveling, transporting or moving that may travel in/on a street, lane, track or path. The host vehicle is also not limited to a land-based vehicle and may be a vehicle capable of flying, diving or sailing.

A controller may be configured to perform the method according to any of the examples outlined above. A computer program may comprise instructions which, when carried out by a processor or a plurality of processors of a computer, cause the computer to perform the method according to any one of the examples outlined above. A host vehicle may comprise the controller or a computer performing the computer program.

The above respective processor/s may be implemented by a respective central processing unit (CPU) including one or a plurality of processors, microprocessor, co-processors or other processing logic that interprets and executes instructions as defined by the computer program stored in memory. This memory may include a random-access memory (RAM), read only memory (ROM) or any other type of dynamic storage device that may store information and instructions for execution by the processor/s. The computer program may be provided on a computer-readable medium connectable to the computer. Such a computer-readable medium may be defined as a physical or a logical memory device. E.g., a logical memory device may include memories within a single physical memory device or distributed across multiple physical memory devices. Each of the RAM, ROM and/or other type of dynamic storage device may include computer-readable media with instructions as program code. The software algorithms may be read into the memory from another computer-readable medium, such as a storage device or from another device via the communication interface.

The software algorithms contained in the memory may cause the processor/s including a data processor, when executed on the processing unit, to perform operations or processes described in the present disclosure. A hard-wired circuitry may be used in place of or in combination with the software algorithms to implement processes and/or operations described in the present disclosure. Therefore, implementations described herein are not limited to any specific combination of hardware and software.

Further, the respective processor/s referred to above may be implemented in hardware, software or a combination thereof e.g., as Field Programmable Gate Arrays (FPGAs), application-specific integrated circuits (ASICs), firmware or the like.

It will be apparent to those skilled in the art that various modifications and variations can be made in the embodiments of the present invention described above, as well as in the construction of the present invention without departing from the scope of the invention. Put differently, the present invention has been described in relation to particular embodiments and examples which are intended in all aspects to be illustrative rather than restrictive. Those skilled in the art will appreciate that many different combinations of hardware, software and/or firmware will be suitable for performing the present invention.

The above embodiments of the present invention were explained as examples and can be omitted or combined in any manner or order conceivable. The scope of the present invention is conveyed by the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for determining a lane/road keeping maneuver of a host vehicle, the computer-implemented method comprising:

determining at least one traveling trajectory of the host vehicle;

detecting a boundary of at least one of a lane or a road on which the host vehicle is traveling;

determining, based on the at least one traveling trajectory and the boundary, whether at least one triggering condition for performing the lane/road keeping maneuver is met; and performing the lane/road keeping maneuver to maintain the host vehicle within a predefined distance from the boundary, wherein the at least one triggering condition is based on a set of parameters, wherein the set of parameters relates to a predetermined acceptable crossover distance from the boundary and a shape of the at least one traveling trajectory, wherein the shape of the at least one traveling trajectory is based on a curvature rate of the host vehicle while traveling and the at least one traveling trajectory relates to predicted traveling of the host vehicle, and wherein the determining of whether the at least one triggering condition is met includes determining whether the at least one traveling trajectory crosses the boundary by at least the predetermined acceptable crossover distance.

2. The computer-implemented method of claim 1, further comprising:

determining at least one steering back trajectory for steering the host vehicle back into a center of the lane/road, wherein the at least one triggering condition is based on the at least one steering back trajectory.

3. The computer-implemented method of claim 2 wherein the determining of whether the at least one triggering condition is met includes determining whether the at least one steering back trajectory crosses the boundary by at least the predetermined acceptable crossover distance.

4. The computer-implemented method of claim 2 wherein the determining of whether the at least one triggering condition is met includes:

shifting the boundary by at least the predetermined acceptable crossover distance; and determining whether at least one of the at least one traveling trajectory and/or the steering back trajectory crosses the shifted boundary.

5. The computer-implemented method of claim 1 wherein the acceptable crossover distance is determined based on at least one of a lane boundary type and a road boundary type.

6. The computer-implemented method of claim 5 wherein the lane boundary type is based on at least one of a marking of the lane or a coloring of the marking of the lane.

7. The computer-implemented method of claim 5 wherein the road boundary type is based on at least one of a location of an edge of the road, a barrier of the road, or a property of a surface of the road.

8. The computer-implemented method of claim 2 wherein the determining of whether the at least one triggering condition is met includes determining whether the at least one traveling trajectory and/or the steering back trajectory crosses the boundary with a predetermined curvature rate of the host vehicle.

9. The computer-implemented method of claim 3 wherein the determining at least one steering back trajectory includes determining a plurality of steering back trajectories, each with a different predetermined curvature rate of the host vehicle.

10. The computer-implemented method of claim 8 wherein the predetermined curvature rate of the host vehicle is determined based on at least one of a severity of steering, a severity of the lane/road keeping maneuver, or a priority of the at least one steering back trajectory.

11. The computer-implemented method of claim 2 wherein the performing the lane/road keeping maneuver further includes steering the host vehicle according to one of the at least one steering back trajectory.

12. The computer-implemented method of claim 1 wherein:

at least one boundary traveling trajectory is determined as a traveling trajectory for the determining of whether the at least one triggering condition is met, and each of the at least one boundary traveling trajectory is determined for a boundary on a side of the host vehicle.

13. The computer-implemented method of claim 2 wherein:

at least one of the traveling trajectory or the steering back trajectory is represented as an intervention motion polynomial, the boundary is represented as a boundary polynomial, and at least one of the predetermined acceptable crossover distance and the curvature rate is a parameter for defining the intervention motion polynomial.

14. A system comprising:

memory hardware configured to store instructions; and processor hardware configured to execute the instructions, wherein the instructions include:

determining at least one traveling trajectory of a host vehicle;

detecting a boundary of a lane or a road on which the host vehicle is traveling;

determining, based on the at least one traveling trajectory and the boundary, whether at least one triggering condition for performing a lane/road keeping maneuver is met; and performing the lane/road keeping maneuver to maintain the host vehicle within a predefined distance from the boundary, wherein the at least one triggering condition is based on a set of parameters, wherein the set of parameters relates to a predetermined acceptable crossover distance from the boundary and a shape of the at least one traveling trajectory, wherein the shape of the at least one traveling trajectory is based on a curvature rate of the host vehicle while traveling and the at least one traveling trajectory relates to predicted traveling of the host vehicle, and wherein the determining of whether the at least one triggering condition is met includes determining whether the at least one traveling trajectory crosses the boundary by at least the predetermined acceptable crossover distance.

15. A non-transitory computer-readable medium comprising instructions including:

determining at least one traveling trajectory of a host vehicle;

detecting a boundary of at least one of a lane or a road on which the host vehicle is traveling;

determining, based on the at least one traveling trajectory and the boundary, whether at least one triggering condition for performing a lane/road keeping maneuver is met; and performing the lane/road keeping maneuver to maintain the host vehicle within a predefined distance from the boundary, wherein the at least one triggering condition is based on a set of parameters, wherein the set of parameters relates to a predetermined acceptable crossover distance from the boundary and a shape of the at least one traveling trajectory, wherein the shape of the at least one traveling trajectory is based on a curvature rate of the host vehicle while traveling and the at least one traveling trajectory relates to predicted traveling of the host vehicle, and wherein the determining of whether the at least one triggering condition is met includes determining whether the at least one traveling trajectory crosses the boundary by at least the predetermined acceptable crossover distance.

* * * * *